United States Patent Office 2,892,862
Patented June 30, 1959

2,892,862
2-HALO-2-OXO-1,3,2-DIOXAPHOSPHORINANES AND PROCESS FOR THEIR PRODUCTION

William M. Lanham, Charleston, W. Va., assignor to Union Carbide Corporation, a corporation of New York No Drawing. Application September 23, 1954
Serial No. 458,015

6 Claims. (Cl. 260—461)

This invention relates to the production of a novel class of 2-halo-2-oxo-1,3,2-dioxaphosphorinanes which are reactive with aliphatic and aromatic amines, ammonia, and alcohols, thiols, phenols, thiophenols and the alkali metal salts thereof to produce esters that have utility as pesticides, plasticizers for synthetic resins, lubricants, hydraulic fluids, dyeing assistants, oil and gasoline additives, and the like.

The novel compounds of the invention have structures corresponding to the formula:

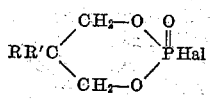

wherein R and R', respectively, designates a radical of the class consisting of hydrogen and the alkyl radicals; and Hal represents a halogen of the class consisting of chlorine, bromine and iodine. Preferably R and R' are alkyl groups having from 1 to 20 carbon atoms. Those compounds wherein both R and R' are alkyl groups have especial utility in certain pesticidal compositions.

These new compounds can be prepared by reacting a phosphoryl halide such as phosphoryl chloride or phosphoryl bromide with a diprimary alkane-1,3-diol. This is surprising in the light of the teachings of Oliver et al. (Ind. Eng. Chem. 42, 488–91 (1950)) that straight chain compounds having diphosphate linkages are produced by reacting phosphoryl chloride with diprimary glycols; and by the teachings of Gamrath Patent 2,504,121 that only the first chlorine atom of phosphoryl chloride reacts with a primary alcohol at 2° to 25° C.

According to this invention the diprimary alkane-1,3-diols used as starting materials have structures designated by the formula: $HO-CH_2CRR'CH_2-OH$ wherein R and R' have the meanings hereinbefore indicated.

In this process, it usually is convenient, particularly in large scale operations, to add the phosphoryl halide in small successive amounts to an agitated suspension or solution of the diol in an inert solvent for the final product. This addition can be reversed with no ill effect, or the two reactants can be fed concurrently into an agitated body of the reaction mixture. The addition commonly is made while maintaining the reaction mixture at a temperature around 25° C., and under an absolute pressure of around 500 mm. of mercury to remove by-product hydrogen chloride as formed. However, reaction temperatures within the range from about 10° C. to about 40° C. are operative; and atmospheric pressure can be used, with subsequent pressure reduction to remove the hydrogen chloride.

When the product being made is a liquid no solvent is needed. When a solvent is employed, any inert solvent for the product which is substantially free from water can be used. Among useful solvents are benzene, toluene, the xylenes, ethylene dichloride, heptane, hexane, ethyl ether, butyl ether and the like.

Equimolar proportions of the two reactants are required for the reaction; and these proportions are preferred. An excess of either reactant can be employed, although an excess of the diol can under certain conditions pose a separation problem.

While the novel products of the invention can be purified either by distillation under vacuum or by crystallization, this usually is not necessary. The residue products are of high purity and are obtained in high yields when the reactants are employed in an equimolar ratio.

Among the useful diprimary alkane-1,3-diols useful in the process are the following, and many others:

2-methyl-2-propyl-1,3-propanediol
2-ethyl-2-methyl-1,3-propanediol
2-ethyl-2-propyl-1,3-propanediol
2-amyl-2-propyl-1,3-propanediol
2-ethyl-2-isopropyl-1,3-propanediol
2-isoamyl-2-isopropyl-1,3-propanediol
2-butyl-2-hexyl-1,3-propanediol
2-ethyl-2-isoamyl-1,3-propanediol
2-isobutyl-2-isohexyl-1,3-propanediol
2-(3-methylamyl)-2-(1-methylpropyl)-1,3-propanediol
2-(tert-butyl)-2-ethyl-1,3-propanediol
2-(3,3-dimethylamyl)-2-(1,1-dimethylpropyl)-1,3-propanediol
2-(3,3,4,4-tetramethylamyl)-2-(1,1,2,2-tetramethylpropyl)-1,3-propanediol
2-(tert-butyl)-2-(2,2-dimethylpropyl)-1,3-propanediol
2-(tert-butyl)-2-(3,3-dimethylbutyl)-1,3-propanediol
2-ethyl-2-hexadecyl-1,3-propanediol
2-hexadecyl-2-octadecyl-1,3-propanediol
2,2-di-(tert-butyl)-1,3-propanediol
2-(tert-butyl)-2-isopropyl-1,3-propanediol
2,2-diisopropyl-1,3-propanediol
2-butyl-2-methyl-1,3-propanediol The novel compounds of this invention also can less advantageously be produced by halogenating a heterocyclic phosphite ester of the type represented by the formula:

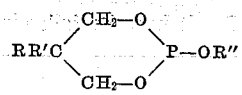

wherein R and R' have the designations hereinbefore given, and R'' is an alkyl, haloalkyl, or aralkyl group. Such phosphite esters can be made by the process described in J. Am. Chem. Soc., vol. 72, pp. 5491–7. The halogenation is conducted at temperatures within the range from about −30° C. to about +50° C., the halogen being added in small successive amounts to the phosphite esters, preferably using stoichiometric proportions of the halogen and the phosphite ester. Chlorine conveniently can be added as a vapor; while bromine is added as liquid bromine, and any of the halogens can be added in the form of solutions thereof in an inert substantially water-free solvent for the final product which is resistant to halogenation, such as benzene, heptane, and halogenated hydrocarbons such as chloroform and ethylene dichloride.

Among useful heterocyclic phosphite esters useful in this form of the invention may be mentioned the 2-methoxy, 2-ethoxy, 2-isopropoxy, and 2-butoxy-1,3,2-dioxaphosphorinanes, and the 5-alkyl-substituted and 5,5-di-alkyl-substituted 1,3,2-dioxaphosphorinanes.

The following examples serve to illustrate the invention.

Example 1

To 920 grams (6 mols) of phosphoryl chloride maintained at a temperature of 25° C. under an absolute pressure of 500 mm. of mercury there were added dropwise a solution consisting of 960 grams (6 mols) of 2-butyl-2- ethyl-1,3-propanediol and 300 cc. of benzene. After an additional hour under these reaction conditions the pressure was reduced to 350 mm. of mercury for one hour, and then the mixture was heated at 50° C. under a pressure of less than 5 mm. of mercury for 20 minutes, and then was allowed to stand under that pressure at 25° C. overnight. There thus were obtained 1427 grams (theory=1442 grams) of 5-butyl-2-chloro-5-ethyl-2-oxo-1,3,2-dioxaphosphorinane in the form of a yellow liquid residue having an equivalent weight (by saponification)=116.6 (theory=120.3); $n_D^{30}$=1.4645; and the following analysis:

|   | Analysis, percent by weight ||
|---|---|---|
|   | Found | Theory |
| C | 45.25 | 44.92 |
| H | 7.54 | 7.54 |
| P | 13.12 | 12.88 |
| Cl | 14.03 | 14.73 |

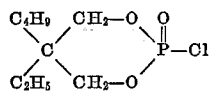

Example 2

To 746 grams (4.87 mols) of phosphoryl chloride held at 25° C. under an absolute pressure of 500 mm. of mercury there were added dropwise during 80 minutes 370 grams (4.87 mols) of 1,3-propanediol with cooling. After holding the reaction mixture at this pressure and temperature for another hour, then reducing the pressure to 350 mm. of mercury for an hour and finally heating the mixture at 50° C. under less than 5 mm. of mercury pressure for 20 minutes, there were recovered 768 grams (theory=762 grams) of residual product which was purified by distillation at 78° C. under a pressure of less than 0.2 mm. of mercury, using a falling film type still. The resultant distillate, 2-chloro-2-oxo-1,3,2-dioxaphosphorinane in the form of a white solid at room temperature, had the following properties: equivalent weight (by saponification)=76.6 (theory=78.3); melting point=39° C. It had the following analysis:

|   | Analysis, percent by weight ||
|---|---|---|
|   | Found | Theory |
| C | 22.80 | 23.02 |
| H | 3.94 | 3.87 |
| P | 19.96 | 19.80 |
| Cl | 23.02 | 22.64 |

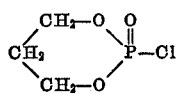

Example 3

To 307 grams (2 mols) of phosphoryl chloride maintained at 25° C. under an absolute pressure of 500 mm. of mercury there were added dropwise during 45 minutes a warm (48°–50° C.) solution of 208 grams (2 mols) of 2,2-dimethyl-1,3-propanediol in 1000 cc. of ethylene dichloride with agitation. After maintaining the reaction mixture under these conditions for an additional hour, then reducing the pressure to 350 mm. of mercury for an hour, and then reducing it to less than 2mm. of mercury for 16 hours, the mixture was heated at 45° C. at a pressure of less than 2 mm. of mercury for one hour. The resultant 363 grams (theory=369 grams) of white, solid residue product, 2-chloro-5,5-dimethyl-2-oxo-1,3,2-dioxaphosphorinane, had a percent purity (by saponification)=98.1; a melting point of 98°–105° C. and the following analysis:

|   | Analysis, percent by weight ||
|---|---|---|
|   | Found | Theory |
| C | 32.76 | 32.56 |
| H | 5.76 | 5.46 |
| P | 16.88 | 16.78 |
| Cl | 18.58 | 19.21 |

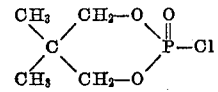

Example 4

To 307 grams (2 mols) of phosphoryl chloride maintained at 25° C. under an absolute pressure of 500 mm. of mercury there were added dropwise during 35 minutes a solution of 132 grams (1 mol) of 2,2-diethyl-1,3-propanediol in 132 cc. of benzene with agitation and cooling. After the addition, the reaction mixture was maintained at 25° C. under 500 mm. of mercury pressure for an additional hour, then at that temperature under 350 mm. of mercury for an hour, and the mixture then was heated at 50° C. under a pressure of less than 0.5 mm. of mercury for 20 minutes. The residual 2-chloro-5,5-diethyl-2-oxo-1,3,2-dioxaphosphorinane was secured in the form of a solid residue product having the following properties: equivalent weight (by saponification) =104.4 (theory=106.3); melting point=42.5°–44.5° C.

|   | Analysis, percent by weight ||
|---|---|---|
|   | Found | Theory |
| C | 39.51 | 39.57 |
| H | 6.73 | 6.64 |
| P | 14.94 | 14.57 |
| Cl | 16.30 | 16.68 |

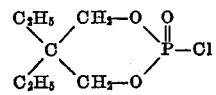

Example 5

During 1.25 hours 78.5 grams (0.491 mol) of bromine was added dropwise to 110 grams (0.5 mol) of 5-butyl-5-ethyl-2-methoxy-1,3,2-dioxaphosphorinane maintained at 0° to 5° C. with agitation and cooling. The reaction mixture was stripped by distillation to a kettle temperature of 45° C. under a pressure of 3 mm. of mercury, yielding 2-bromo-5-butyl-5-ethyl-2-oxo-1,3,2-dioxaphosphorinane in the form of 141 grams of a light yellow liquid residue having the following properties: percent purity (by saponification)=98%; $n_D^{30}$=1.4827; percent bromine by weight=27.65 (theory=28.03).

Example 6

During 40 minutes a solution of 76 grams (0.3 mol) of iodine crystals in 500 cc. of ethyl ether were added dropwise with agitation and cooling to 66 grams (0.3 mol) of 5-butyl-5-ethyl-2-methoxy-1,3,2-dioxaphosphorinane maintained at a temperature of 0° to —5° C. The reaction mixture then was stripped by distillation to a kettle temperature of 25° C. under a pressure of less than 1 mm. of mercury yielding 94 grams (theory=100 grams) of 5-butyl-5-ethyl-2-iodo-2-oxo-1,3,2-dioxaphosphorinane in the form of a brown liquid residue having $n_D^{30}=1.5163$; and a percent purity (by saponification) =99.6.

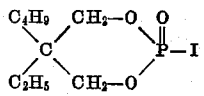

This application is a continuation-in-part of my pending application Serial No. 340,400, filed March 4, 1953, and entitled, "Production of Heterocyclic Phosphorus-Containing Compounds."

The invention is susceptible of modification within the scope of the appended claims.

I claim:

1. As new products, heterocyclic phosphorus-containing halides having structures represented by the formula:

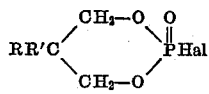

wherein R is hydrogen, and R¹ designates an alkyl radical having 1 to 20 carbon atoms; and Hal designates a halogen of the class consisting of chlorine, bromine and iodine.

2. As new products, heterocyclic phosphorus-containing halides having structures represented by the formula:

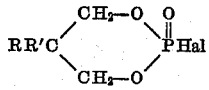

wherein R and R', respectively, designates an alkyl group having 1 to 20 carbon atoms; and Hal designates a halogen of the class consisting of chlorine, bromine and iodine.

3. As new products, heterocyclic phosphorus-containing halides having structures represented by the formula:

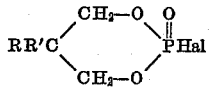

wherein R and R', respectively, designates an alkyl group having 1 to 20 carbon atoms, each of such groups containing at least 2 carbon atoms; and Hal designates a halogen of the class consisting of chlorine, bromine and iodine.

4. As new products, heterocyclic phosphorus-containing halides having structures represented by the formula:

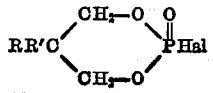

wherein R and R', respectively, designates an alkyl group having 1 to 20 carbon atoms, each of such groups being identical; and Hal designates a halogen of the class consisting of chlorine, bromine and iodine.

5. Process for producing heterocyclic phosphorus-containing halides, having structures represented by the formula:

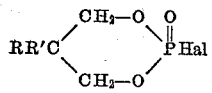

wherein R and R', respectively, designates a radical of the class consisting of hydrogen and the alkyl radicals having 1 to 20 carbon atoms, and Hal designates a halogen of the class consisting of chlorine, bromine and iodine, which comprises reacting a halogen of the class consisting of chlorine, bromine and iodine with a 1,3,2-dioxaphosphorinane substituted in the 2-position of the heterocyclic ring by a radical of the class consisting of the alkoxy radicals, at a temperature within the range between around −30° C. and +50° C.

6. Process for producing heterocyclic phosphorus-containing halides, having structures represented by the formula:

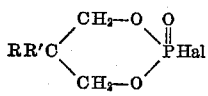

wherein R and R', respectively, designates a radical of the class consisting of hydrogen and the alkyl radicals having 1 to 20 carbon atoms, and Hal designates a halogen of the class consisting of chlorine, bromine and iodine, which comprises reacting a halogen of the class consisting of chlorine, bromine and iodine with a 1,3,2-dioxaphosphorinane substituted in the 2-position of the heterocyclic ring by a radical of the class consisting of the alkoxy radicals, and substituted in the 5-position with at least one alkyl group having 1 to 20 carbon atoms, at a temperature within the range between around −30° C. and +50° C.

References Cited in the file of this patent

UNITED STATES PATENTS

| | | |
|---|---|---|
| 2,661,365 | Gamrath et al. | Dec. 1, 1953 |
| 2,744,128 | Morris et al. | May 1, 1956 |